(12) United States Patent
Zhang

(10) Patent No.: US 10,202,038 B2
(45) Date of Patent: Feb. 12, 2019

(54) ELECTRIC-VEHICLE SLIP CONTROL DEVICE

(71) Applicant: NTN CORPORATION, Osaka (JP)

(72) Inventor: Yingjie Zhang, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/069,256

(22) Filed: Mar. 14, 2016

(65) Prior Publication Data

US 2016/0193919 A1    Jul. 7, 2016

Related U.S. Application Data

(63) Continuation of application No. PCT/JP2014/073862, filed on Sep. 10, 2014.

(30) Foreign Application Priority Data

Sep. 18, 2013  (JP) ................. 2013-192602

(51) Int. Cl.
   *B60K 28/16*     (2006.01)
   *B60L 3/10*      (2006.01)
   *B60L 15/20*     (2006.01)

(52) U.S. Cl.
   CPC .............. *B60K 28/16* (2013.01); *B60L 3/102* (2013.01); *B60L 15/20* (2013.01);
   (Continued)

(58) Field of Classification Search
   USPC .......................................... 701/82
   See application file for complete search history.

(56) References Cited

U.S. PATENT DOCUMENTS 7,072,756 B2    7/2006  Matsuda
7,315,804 B2    1/2008  Sato et al.
(Continued)

FOREIGN PATENT DOCUMENTS

CN    1488538 A    4/2004
CN    101687501 A   3/2010
(Continued)

OTHER PUBLICATIONS

International Search Report dated Nov. 11, 2014 in corresponding International Patent Application No. PCT/JP2014/073862.
(Continued)

*Primary Examiner* — Redhwan K Mawari
*Assistant Examiner* — Rodney P King

(57) ABSTRACT

In a slip control device for an electric vehicle, a slip control section is provided which is configured to perform, in a control repetition cycle, a series of slip control of determining whether or not a slip state has occurred, on the basis of the number of rotations of a drive wheel and the number of rotations of a driven wheel observed by respective rotation number observation sections and, and decreasing a torque command value to a motor if the slip state has occurred. A vehicle speed detection section configured to detect a vehicle speed and a control repetition cycle change section configured to lengthen the control repetition cycle of the slip control section when the vehicle speed detected by the vehicle speed detection section is in a predetermined low-speed range, are provided.

6 Claims, 5 Drawing Sheets

(52) U.S. Cl.
CPC ....... *B60L 2220/44* (2013.01); *B60L 2220/46* (2013.01); *B60L 2240/12* (2013.01); *B60L 2240/423* (2013.01); *B60L 2240/461* (2013.01); *B60L 2240/465* (2013.01); *B60L 2270/145* (2013.01); *B60W 2720/26* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 8,392,041 | B2 | 3/2013 | Uchiyama et al. |
| 8,880,261 | B2 | 11/2014 | Kobayashi et al. |
| 8,886,381 | B2 | 11/2014 | Ozaki |
| 9,114,711 | B2 | 8/2015 | Ozaki |
| 2004/0107082 | A1* | 6/2004 | Sato ............... B60T 8/17551 703/8 |
| 2005/0103549 | A1* | 5/2005 | Matsuda ............. B60K 6/44 180/243 |
| 2007/0075659 | A1* | 4/2007 | Uenodai ........... B60L 11/1887 318/139 |
| 2010/0185351 | A1 | 7/2010 | Uchiyama et al. |
| 2012/0279793 | A1 | 11/2012 | Kikuchi et al. |
| 2013/0144480 | A1 | 6/2013 | Kobayashi et al. |
| 2013/0345917 | A1 | 12/2013 | Ozaki |
| 2015/0142240 | A1 | 5/2015 | Ozaki |

FOREIGN PATENT DOCUMENTS

| | | |
|---|---|---|
| CN | 102666224 A | 9/2012 |
| CN | 103068610 A | 4/2013 |
| EP | 1 535 786 A1 | 6/2005 |
| JP | 04-103845 | 4/1992 |
| JP | 2002-178864 | 6/2002 |
| JP | 2003-32806 | 1/2003 |
| JP | 2009-77505 | 4/2009 |
| JP | 2012-55113 | 3/2012 |
| JP | 2012-186928 | 9/2012 |
| JP | 2014-236591 | 12/2014 |
| WO | WO 2011/089830 | 7/2011 |

OTHER PUBLICATIONS

International Preliminary Report on Patentability dated Mar. 31, 2016 in corresponding International Patent Application No. PCT/JP2014/073862.

Extended European Search Report dated Mar. 24, 2017 in corresponding European Patent Application No. 14845633.8.

Yuhua Li et al., "The measurement of instantaneous angular speed", Mechanical Systems and Signal processing, vol. 19, Elsevier, Jul. 1, 2005, pp. 786-805, (online Jun. 20, 2004).

Chinese Office Action dated Dec. 1, 2016 in corresponding Chinese Patent Application No. 201480050720.7.

Chinese Office Action dated Jul. 14, 2017 in related Chinese Application No. 201480050720.7.

Japanese Office Action dated Jun. 6, 2017 in related Japanese Application No. 2013-192602.

* cited by examiner

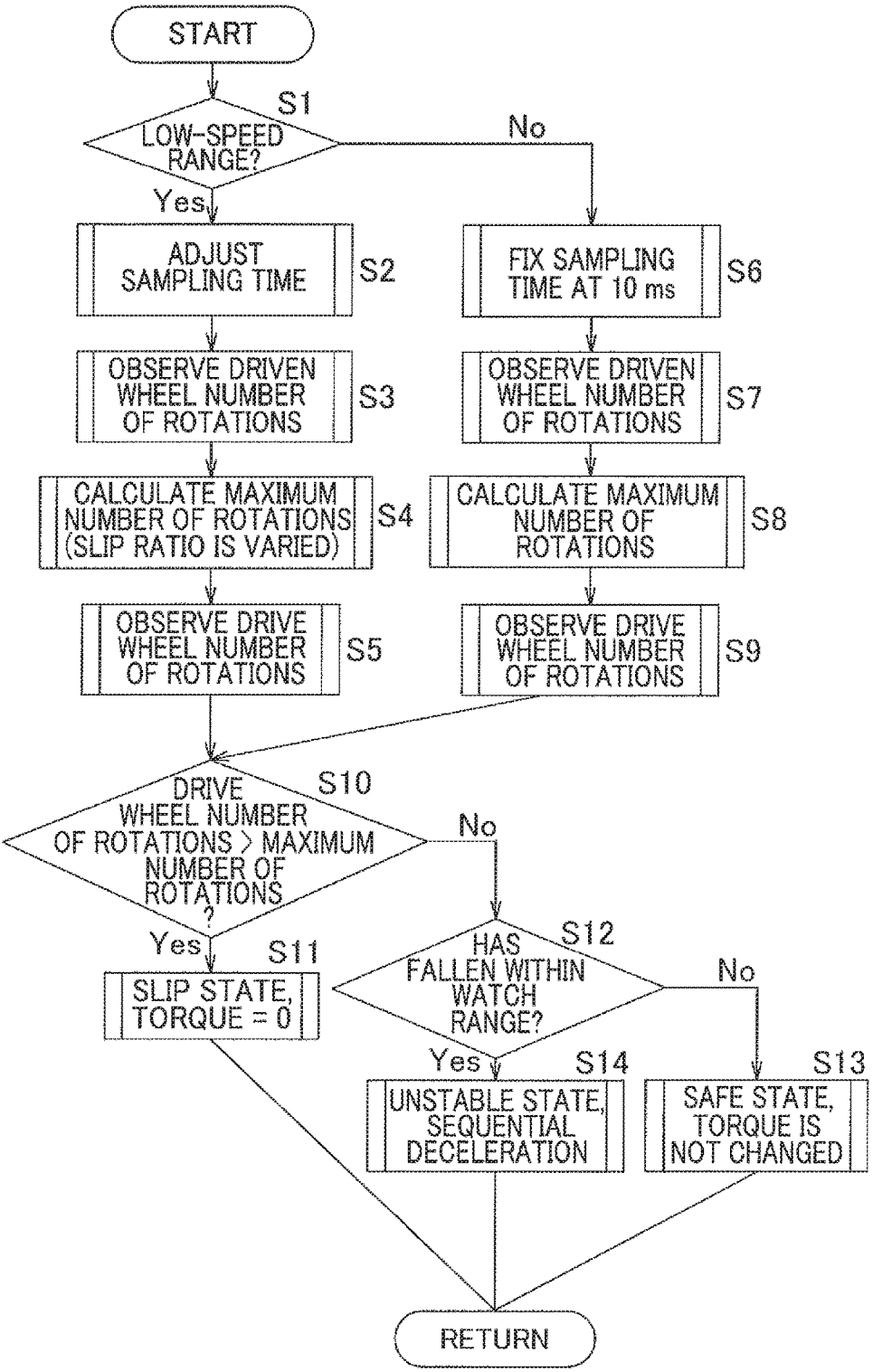

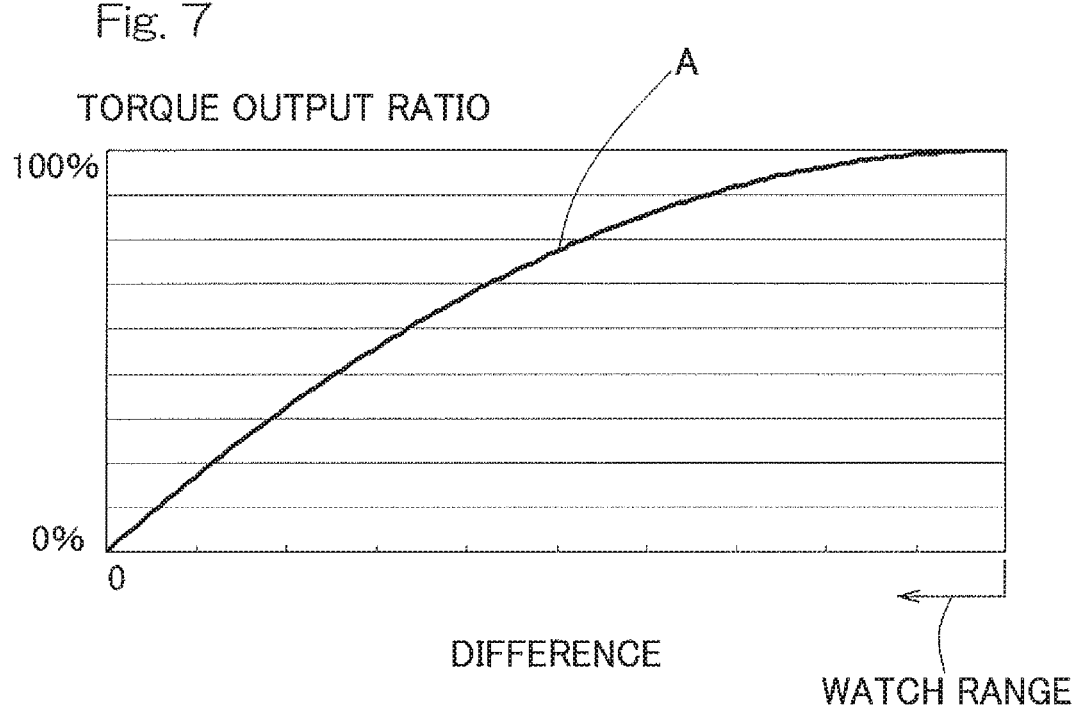

ELECTRIC-VEHICLE SLIP CONTROL DEVICE

CROSS REFERENCE TO THE RELATED APPLICATION

This application is a continuation application, under 35 U.S.C. § 111(a), of international application No. PCT/JP2014/073862, filed Sep. 10, 2014, which is based on and claims Convention priority to Japanese patent application No. 2013-192602, filed Sep. 18, 2013, the entire disclosure of which is herein incorporated by reference as a part of this application.

BACKGROUND OF THE INVENTION

Field of the Invention

The present invention relates to a slip control device for an electric vehicle, and relates to a technique to be able to accurately perform slip control even when a vehicle speed is in a low-speed range.

Description of Related Art

Following conventional art 1 has been proposed for an electric vehicle which performs slip control (Patent Document 1). A slip ratio λ is obtained by slip ratio estimation section on the basis of numbers of rotations N1 and N2 of a driven wheel and a drive wheel. Then, a generated torque estimation value Te due to another external force such as the vehicle body weight applied to the vehicle is obtained by a disturbance observer. An entire action torque T acting on the drive wheel is obtained by an action torque estimation section on the basis of the generated torque estimation value Te and a motor torque Tm, and a coefficient of friction μ between a road surface and a tire is estimated by a friction coefficient estimation section on the basis of this torque and the slip ratio λ. A permissible maximum torque Tmax is obtained on the basis of this coefficient of friction μ and a vertical load FZ, and torque limitation is performed such that the torque does not exceed the permissible maximum torque Tmax.

In other conventional art 2, a drive wheel maximum number of rotations is calculated on the basis of the number of rotations N1 of a driven wheel and an ideal slip ratio (λ=0.15). Torque control is performed such that the number of rotations of a rear wheel actually does not exceed this calculated maximum number of rotations. Furthermore, in order to improve riding comfort, before the number of rotations of the drive wheel reaches the maximum number of rotations, a watch range number of rotations that is set so as to be lower than this maximum number of rotations is provided. If the number of rotations of the drive wheel falls within the watch range number of rotations, torque change when the number of rotations of the drive wheel reaches the maximum number of rotations is reduced by sequentially (gradually) decreasing the torque, thereby reducing shock of a vehicle body (JP Laid-open Patent Publication No. 2014-236591).

RELATED DOCUMENT

Patent Document

[Patent Document 1] JP Laid-open Patent Publication No. 2012-186928

In conventional arts 1 and 2, it is an essential condition to use a relationship among the numbers of rotations of both the driven wheel and the drive wheel and the slip ratio thereof, but, in reality, the number of rotations of the driven wheel cannot be correctly measured, for example, in a low-speed range of a vehicle speed of not greater than 10 Km/h in many cases. This is because a wheel speed sensor is an electromagnetic pickup type, and thus, for example, when the vehicle runs at a very low speed, a response cycle of the wheel speed sensor is low depending on the number of teeth of a sensor rotor and therefore cannot catch up with a control repetition cycle of a controller. In a controller that controls a motor, a control repetition cycle is generally about 10 ms at present.

For example, regarding a tire having a radius of 0.3 m, in the case where there are 66 teeth on the entire circumference of the sensor rotor, when the vehicle speed is 5 km/h, the response cycle of the wheel speed sensor is 20 ms per tooth. In this case, the response cycle is too slow for a control repetition cycle of 10 ms of a controller used for the motor control of the electric vehicle, thereby leading to an erroneous operation of the controller. As the number of the teeth of the sensor rotor is increased, the response cycle increases. However, there are limitations on processing of the sensor rotor. Therefore, in the above low-speed range, the number of rotations of the wheel cannot be correctly detected in some cases.

SUMMARY OF THE INVENTION

An object of the present invention is to provide a slip control device for an electric vehicle which slip control device is able to accurately perform slip control by correctly detecting the number of rotations of a wheel regardless of a vehicle speed.

Hereinafter, in order to facilitate understanding of the present invention, the present invention will be described with reference to the reference numerals in embodiments for the sake of convenience.

A slip control device for an electric vehicle according to the present invention is a slip control device 20 for an electric vehicle which is a vehicle including an electric motor 3 configured to rotationally drive a drive wheel 7, the slip control device 20 performing slip control of the electric vehicle, the slip control device 20 including:

a drive wheel rotation number observation section 23 configured to observe the number of rotations of the drive wheel 7;

a driven wheel rotation number observation section 21 configured to observe the number of rotations of a driven wheel 6;

a slip control section 28 configured to perform, in a control repetition cycle, a series of slip control which determine whether or not a slip state has occurred, on the basis of the number of rotations of the drive wheel observed by the drive wheel rotation number observation section 23 and the number of rotations of the driven wheel observed by the driven wheel rotation number observation section 21, and which decrease a torque command value to the motor 3 if the slip state has occurred;

a vehicle speed detection section 29 configured to detect a vehicle speed; and a control repetition cycle change section 30 configured to lengthen the control repetition cycle of the slip control section 28 when the vehicle speed detected by the vehicle speed detection section 29 is in a predetermined low-speed range.

The "number of rotations" in the present specification is the number of rotations per unit time and is synonymous with a rotation speed. In the present specification, the phrase "decreasing a torque command" or the phrase "decreasing a torque command value" also includes causing the torque command (or torque command value) to be zero.

According to this configuration, the slip control section 28 determines whether or not a slip state has occurred, on the basis of the number of rotations of the drive wheel and the number of rotations of the driven wheel observed by the drive wheel rotation number observation section 23 and the driven wheel rotation number observation section 21, respectively. As a result of the determination, if the slip state has occurred, the slip control section 28 performs the series of slip control of decreasing the torque command to the motor 3, in the variable control repetition cycle. While the slip control is performed, the control repetition cycle change section 30 lengthens the control repetition cycle of the slip control section 28 when the detected vehicle speed is in the predetermined low-speed range (e.g., equal to or less than 10 km/h).

By making the control repetition cycle of the slip control section 28 variable and then lengthening the control repetition cycle in the low-speed range as described above, the response cycle of the sensor can be prevented from being too slow for the control repetition cycle of the slip control section 28. Accordingly, it is possible to prevent an erroneous operation of the slip control section 28 and to accurately detect a driven wheel number of rotations, thereby accurately performing the slip control. As described above, according to the present invention, the slip control can be accurately performed by correctly detecting the number of rotations of the wheel regardless of the vehicle speed.

The electric vehicle may include a rotation detection section 15 configured to detect the number of rotations of the driven wheel 6, the rotation detection section 15 may include: a rotor 15a with a plurality of to-be-detected portions 15aa arranged around a rotation center at equal pitches, the rotor 15a configured to rotate integrally with the driven wheel 6; and a sensor 15b opposed to the to-be-detected portions 15aa of the rotor 15a and configured to detect the to-be-detected portions 15aa, and when the vehicle speed is in the predetermined low-speed range, the control repetition cycle change section 30 may set the control repetition cycle (a time period or periodic time of one cycle) T in accordance with the vehicle speed according to a following formula:

$$T=1000\times 2 7\pi R/VN,$$

where R is a tire radius (m), V is the vehicle speed (m/s), and N is the number of the to-be-detected portions of the rotor 15a.

A response cycle Ts of the sensor 15b which detects the to-be-detected portions is calculated by the above formula. According to the formula, for example, when the vehicle speed is in the low-speed range of not greater than 10 km/h, the response cycle Ts of the sensor 15b which detects the to-be-detected portions 15aa becomes slow as the vehicle speed decreases. In such a case, even if the control repetition cycle T of the slip control section 28 is merely lengthened, for example, with a predetermined multiplying factor, the response cycle Ts of the sensor 15b may be too slow for the control repetition cycle T of the slip control section 28, depending on the vehicle speed.

Thus, by setting the control repetition cycle T of the slip control section 28 with the response cycle Ts itself of the sensor 15b corresponding to the vehicle speed, the control repetition cycle T of the slip control section 28 can be assuredly caused to coincide with the response cycle of the sensor 15b even when the vehicle speed is any speed in the low-speed range.

The slip control section 28 may include:

a slip ratio change section 31 configured to change a slip ratio λ when the vehicle speed detected by the vehicle speed detection section 29 is in the predetermined low-speed range;

a maximum rotation number calculation section 22 configured to calculate a present drive wheel maximum number of rotations Nmax using the slip ratio λ changed by the slip ratio change section 31 and a present or current number of rotations N1 of the driven wheel observed by the driven wheel rotation number observation section, according to a relation indicated by a following formula:

$$(N\mathrm{max}-N1)/N1=\lambda; \text{and}$$

a slip state determination section 24 configured to determine that a slip state has occurred, when the number of rotations of the drive wheel observed by the drive wheel rotation number observation section 23 has exceeded the calculated drive wheel maximum number of rotations Nmax.

When the vehicle speed is in the predetermined low-speed range, the drive wheel maximum number of rotations calculated with the slip ratio λ that is a slip ratio λ0 which serves as a reference (e.g., λ=λ0=0.15) is small, and thus, due to an error of the sensor, the number of rotations of the drive wheel may fall within a watch range or may exceed the drive wheel maximum number of rotations, erroneously. In order to prevent this, in the low-speed range, the slip ratio change section 31 changes the slip ratio λ in accordance with the vehicle speed. The maximum rotation number calculation section 22 calculates the drive wheel maximum number of rotations with the changed slip ratio λ.

Then, when the observed number of rotations of the drive wheel exceeds the calculated drive wheel maximum number of rotations, the slip state determination section 24 determines that the slip state has occurred. As a result of the determination that the slip state has occurred, the torque command to the motor 3 is decreased. When the vehicle speed shifts to, for example, an intermediate-speed or high-speed range, the drive wheel maximum number of rotations is calculated with the slip ratio λ0 which serves as a reference. Then, determination as to a slip state by the slip state determination section 24 is performed similarly as described above.

The slip control section 28 may include:

a slip watch range determination section 25 configured to determine whether or not the number of rotations of the drive wheel has exceeded a watch range number of rotations which is set so as to be lower than the drive wheel maximum number of rotations, if the slip state determination section 24 determines that the number of rotations of the drive wheel has not exceeded the drive wheel maximum number of rotations; and a watch range-time torque reduction section 27 configured to decrease the torque command value to the motor 3 if the slip watch range determination section 25 determines that the number of rotations of the drive wheel has exceeded the watch range number of rotations.

As described above, even when no slip has occurred, if the drive wheel number of rotations falls within the watch range where a slip is likely to occur, the torque of the motor 3 is decreased to some extent beforehand, whereby shock and vibration of the vehicle body in the case that the torque is made zero due to occurrence of a slip are reduced, so that occurrence of an uncomfortable feeling in an occupant can be alleviated.

The motor 3 may be forming an in-wheel motor device 11. In the case of the in-wheel motor device 11, each wheel 7 is individually driven by the motor and is greatly affected by a slip. Therefore the effect by the above slip control is more effectively exerted.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which the scope is to be determined by the appended claims. In the accompanying drawings, like reference numerals are used to denote like parts throughout the several views, and:

FIG. 6 is a flowchart showing a control operation of the slip control device; and FIG. 7 is a graph showing a relationship between a difference and a torque output ratio in the slip control device.

DESCRIPTION OF EMBODIMENTS

Figure 1:
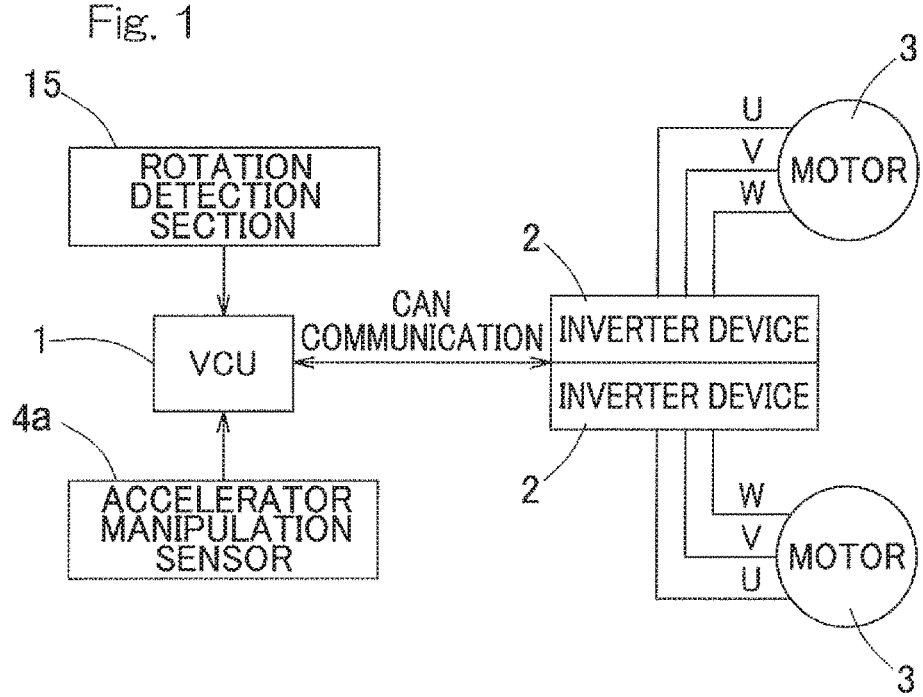
FIG. 1 is a block diagram showing a schematic configuration of an electric vehicle drive apparatus including slip control devices, for an electric vehicle, according to an embodiment of the present invention.

An embodiment of the present invention will be described with reference to FIGS. 1 to 7. FIG. 1 shows an electric vehicle drive apparatus including slip control devices according to the embodiment. The electric vehicle drive apparatus includes a VCU (vehicle control unit) 1 and inverter devices 2. The VCU 1 is a computer type electric control unit which performs integrated control and cooperative control of the entire vehicle, and is also referred to as "ECU". Each inverter device 2 is a device which converts a direct current into an alternating current. In the present embodiment, each inverter device 2 has a function as a controller which applies a three-phase alternating driving current to each traction motor 3 in accordance with a drive command sent from the VCU 1.

The VCU 1 and the inverter devices 2 are connected to each other so as to enable signal transmission therebetween via control area network (CAN) communication or the like. In this example, each motor 3 is an induction motor or a synchronous motor driven by a three-phase alternating current. A torque command or a torque command value which indicates an accelerator manipulation amount and is outputted from an accelerator manipulation sensor 4a is inputted to the VCU 1, and distributed from the VCU 1 to the inverter devices 2, 2 for the respective motors 3. In addition, rotation detection section 15 configured to detect the number of rotations of a driven wheel is electrically connected to the VCU 1. The number of rotations of the driven wheel detected by the rotation detection section 15 is used for calculation for slip control in the inverter device 2 via the VCU 1. The rotation detection section 15 may be connected to the inverter devices 2.

Figure 2:
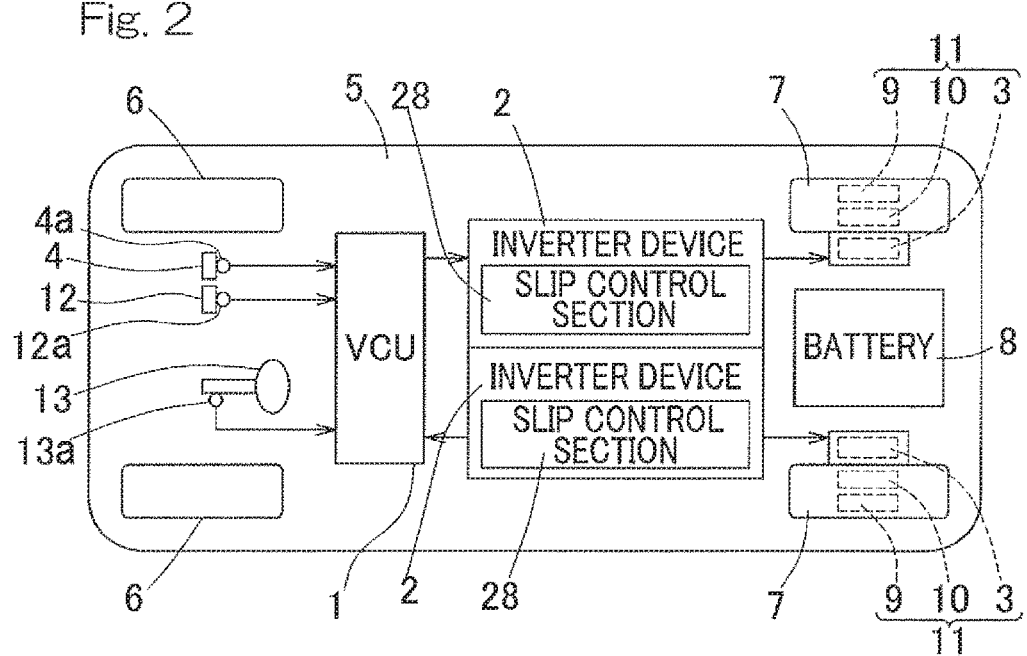
FIG. 2 is a block diagram showing a specific example of the electric vehicle drive apparatus.

FIG. 2 shows a specific example of the electric vehicle drive apparatus. The electric vehicle is a vehicle 5 which is a four-wheel vehicle including a vehicle body with driven wheels 6 as front wheels and with drive wheels 7 as rear wheels. In this example, each motor 3, together with a wheel bearing 9 and a reducer or reduction gear 10, forms an in-wheel motor device 11. The reducer 10 reduces the speed of rotation output of the motor 3 and transmits the reduced rotation output to a rotating ring (not shown) of the wheel bearing 9. A direct motor type in-wheel motor device may be provided which transmits the rotation output of the motor 3 directly to the wheel bearing 9 without using the reducer 10.

A signal indicating an accelerator manipulation amount, a signal indicating a brake manipulation amount, and a signal indicating a steering wheel manipulation amount are inputted to the VCU 1 from the accelerator manipulation sensor 4a for an accelerator 4, a brake manipulation sensor 12a for a brake 12, and a steering sensor 13a for a steering wheel 13, respectively. In accordance with the signal indicating the accelerator manipulation amount from the accelerator manipulation sensor 4a, the VCU 1 generates torque command values to be distributed to the respective right and left motors 3, 3, in consideration of the signal indicating the brake manipulation amount and the signal indicating the steering wheel manipulation amount, and sends the torque command values to the respective inverter devices 2, 2.

Each inverter device 2 converts a direct current from a battery 8 into an alternating current which is a motor driving current, and controls the motor driving current in accordance with the torque command. A main slip control section 28 in a slip control devices 20 (FIG. 3), for the electric vehicle, according to the embodiment are provided to the respective inverter devices 2, 2. Some of the parts forming each slip control device 20 (FIG. 3) may be provided in the VCU 1.

Figure 3:
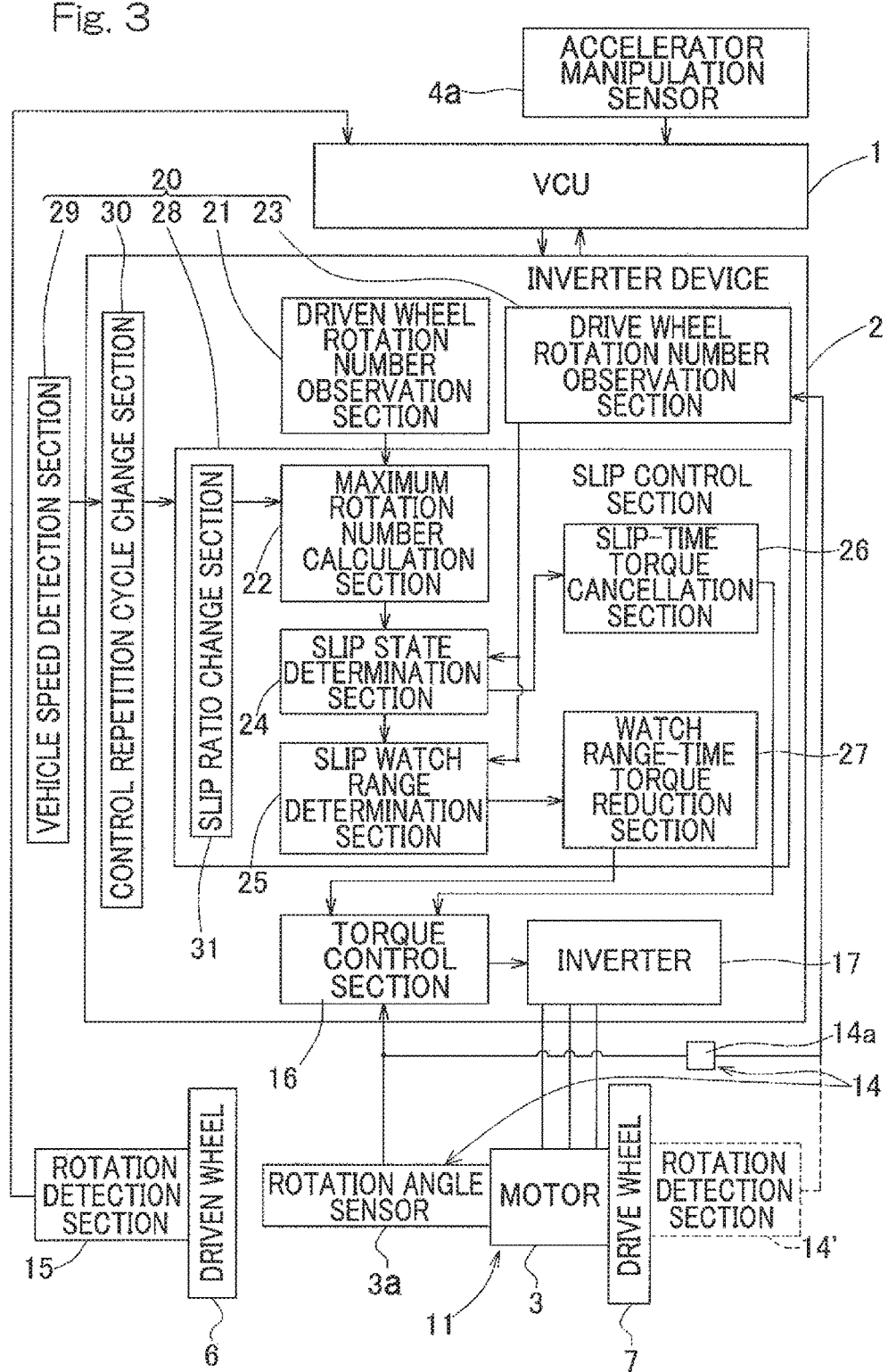
FIG. 3 is a block diagram showing a schematic configuration of the slip control device, etc. of the electric vehicle drive apparatus.

FIG. 3 is a block diagram showing a schematic configuration of the slip control device 20, etc. The inverter device 2 includes: an inverter 17 which converts a direct current from a battery, which is not shown, into a three-phase alternating current; and torque control section 16 which converts the torque command (or torque command value) sent from the VCU 1, into a current command (or current command value) and controls a current output of the inverter 17. The torque control section 16 has a control section to perform vector control or the like which achieves efficiency improvement in accordance with a rotation angle of a rotor (not shown) of the motor 3. For the control, a rotation angle detection value of a rotation angle sensor 3a provided to the motor 3 is inputted to the torque control section 16.

Rotation number conversion section 14a (FIG. 3) is provided which differentiates the rotation angle detection value from the rotation angle sensor 3a and multiplies the differentiated value by a speed reduction rate of the reducer 10 (FIG. 2), thereby to calculate the number of rotations of the drive wheel 7. The rotation number conversion section 14a and the rotation angle sensor 3a form rotation detection section 14 configured to detect the number of rotations of the drive wheel 7. In addition to or instead of the rotation angle sensor 3a, rotation detection section 14' configured to detect the number of rotations of the drive wheel 7 may be provided, for example, on the wheel bearing 10 (FIG. 2). To the driven wheel 6, the rotation detection section 15 configured to detect the number of rotations of the driven wheel 6 is provided, for example, on a wheel bearing or the like.

Figure 4:
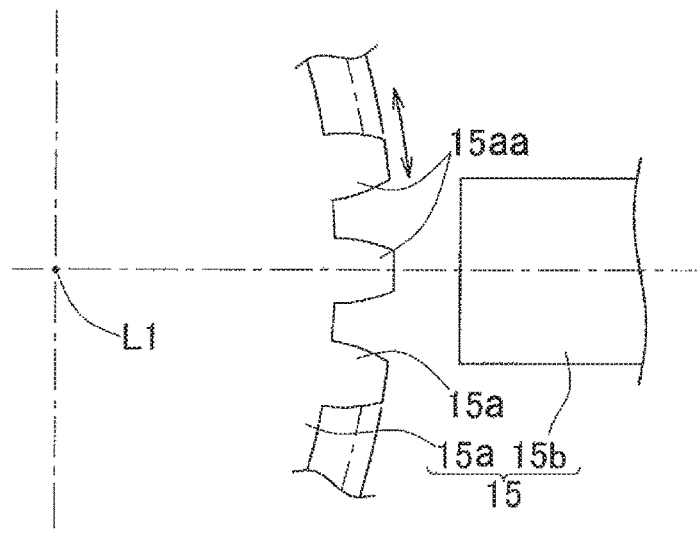
FIG. 4 is a diagram schematically showing rotation detection section of the electric vehicle.

As shown in FIG. 4, the rotation detection section 15 is radial type rotation detection section including a rotor 15a and a sensor 15b. The rotor 15a includes a plurality of to-be-detected portions 15aa which are arranged around a rotation center L1 at equal pitches. For example, the rotor 15a is provided on a rotating ring (not shown) of the wheel bearing and rotates integrally with the driven wheel 6 (FIG. 3). The sensor 15b is, for example, an electromagnetic pickup type magnetic sensor, is opposed to the to-be-detected portions 15aa of the rotor 15a across a radial gap, and detects the to-be-detected portions 15aa. In this example, as the plurality of to-be-detected portions 15aa, teeth of a gear type pulse coder formed on an outer peripheral portion of the rotor 15a are used, but the plurality of to-be-detected portions 15aa is not limited thereto. For example, a magnetic encoder including to-be-detected portions composed of magnetic poles may be used instead of the teeth of the gear type pulse coder or recesses and projections. Axial type rotation detection section 15 may be used in which a detection portion of the sensor 15b is opposed to the to-be-detected portions 15aa across an axial gap. In addition, although the rotation detection section 15 for the driven wheel 6 has been described, in the case where the rotation detection section 14' for the drive wheel 7 is provided, the rotation detection section 14' is the same as the above rotation detection section 15.

As shown in FIG. 3, the torque control section 16 is provided in a light current circuit segment composed of a microcomputer or another electronic circuit. The slip control section 28 of the slip control device 20 is provided in the light current circuit segment. Control by the slip control devices 20 is performed via the respective torque control sections 16 individually for the right and left drive wheels 7. Each slip control device 20 performs control shown in a flowchart of FIG. 6 described later.

The inverter device 2 performs various kinds of control for motor driving in a set control repetition cycle. One kind of control performed in the control repetition cycle by the inverter device 2 is slip control. In the slip control, a process in one cycle from START to RETURN in the flowchart of FIG. 6 described later is repeatedly performed. Specifically, every control repetition cycle, control is performed as to whether a torque command value is decreased or is maintained unchanged. In each inverter device 2 according to the embodiment, the control repetition cycle is not fixed but is variable.

The slip control device 20 includes a driven wheel rotation number observation section 21, a drive wheel rotation number observation section 23, the slip control section 28, a vehicle speed detection section 29, and a control repetition cycle change section 30. The driven wheel rotation number observation section 21 observes a driven wheel number of rotations which is the number of rotations of the driven wheel 6 obtained from the rotation detection section 15, via the VCU 1 constantly, that is, every control repetition cycle described above. The observed number of rotations of the driven wheel 6 may be the average of detection values of the numbers of rotations of the driven wheels 6 at both right and left sides, or may be the number of rotations of the driven wheel 6 at the laterally same side as the drive wheel 7 for which the slip control is performed.

The drive wheel rotation number observation section 23 observes a drive wheel number of rotations which is the number of rotations of the drive wheel 7 obtained from the rotation detection sections 14 or 14'. The slip control section 28 performs a series of slip control of decreasing a torque command (value) to the motor 3. The slip control section 28 determines whether or not a slip state has occurred, on the basis of the observed drive wheel number of rotations and the observed driven wheel number of rotations. If the slip state has occurred, the series of slip control is performed in the variable control repetition cycle. The control repetition cycle change section 30 lengthens the control repetition cycle of the slip control section 28 when a vehicle speed detected by the vehicle speed detection section 29 is in a predetermined low-speed range (e.g., equal to or less than 10 km/h).

Regarding the control repetition cycle of the slip control section 28 in the low-speed range, a response cycle Ts (ms) of the rotation speed sensor of the rotation detection section 15 is calculated by the following formula (1).

$$Ts = 1000 \times 2\pi R / VN \qquad (1)$$

R is a tire radius (m), V is the vehicle speed (m/s), and N is the number of teeth (the to-be-detected portions) of the above-described rotor.

According to formula (1), the response cycle Ts of the rotation speed sensor becomes slow as the vehicle speed V decreases. In particular, when the vehicle speed V is in the low-speed range of not greater than 10 km/h, if the control repetition cycle of the slip control section 28 remains fixed at 10 ms, the response cycle Ts of the rotation speed sensor is too long for the control repetition cycle of the slip control section 28.

Thus, when the vehicle speed is in the predetermined low-speed range (equal to or less than 10 km/h), the control repetition cycle change section 30 lengthens the control repetition cycle of the slip control section 28. Specifically, for the slip control, the control repetition cycle is made variable, and the response cycle Ts (ms) of the rotation speed sensor which is calculated by formula (1) is designated as the control repetition cycle T of the slip control section 28. Accordingly, in the low-speed range, the response cycle Ts of the rotation speed sensor is prevented from being too slow for the control repetition cycle T of the slip control section 28. By setting the control repetition cycle T of the slip control section 28 with the response cycle Ts itself of the rotation speed sensor corresponding to the vehicle speed, the control repetition cycle T of the slip control section 28 can be assuredly caused to substantially coincide with the response cycle of the sensor even when the vehicle speed is any speed in the low-speed range. When the vehicle speed is an intermediate-speed or high-speed range, the response cycle Ts of the rotation speed sensor becomes shorter than or equal to 10 ms and thus is prevented from being too slow for the control repetition cycle of 10 ms which is initially set in the slip control section 28.

The slip control section 28 includes a slip ratio change section 31, a maximum rotation number calculation section 22, a slip state determination section 24, and a slip-time torque cancellation section 26. The slip ratio change section 31 changes a slip ratio $\lambda$ from a standard slip ratio or a slip ratio $\lambda 0$ (e.g., $\lambda 0 = 0.15$), which serves as a reference, in accordance with the vehicle speed. For examples, the slip ratio change section 31 sets the slip ratio $\lambda$ at 0.3 when the vehicle speed exceeds 0 km/h and is equal to or less than 5 km/h, and sets the slip ratio λ at 0.2 when the vehicle speed exceeds 5 km/h and is equal to or less than 10 km/h. When the vehicle speed exceeds 10 km/h and is in the intermediate-speed or high-speed range, the slip ratio change section 31 keeps the slip ratio λ as the slip ratio λ0 (e.g., λ=λ0=0.15) which serves as a reference.

The maximum rotation number calculation section 22 calculates a drive wheel maximum number of rotations with the above-described slip ratio corresponding to the vehicle speed. The drive wheel maximum number of rotations Nmax can be calculated on the basis of a relational expression indicated by the following formula (2). Formula (2) is a calculation formula for the case of acceleration of the vehicle, not for the case of deceleration of the vehicle.

$$(Nmax-N1)/Nmax=\lambda \quad (2)$$

N1 is the number of rotations of the driven wheel 6.

In the intermediate-speed or high-speed range, if the slip ratio λ of the drive wheel 7 exceeds 0.15, a gripping force between the tire and the ground decreases, so that the vehicle falls into an unstable state. In order to avoid such a situation, the torque command to the motor 3 is controlled such that the drive wheel maximum number of rotations calculated with the slip ratio λ is not exceeded.

Figure 5:
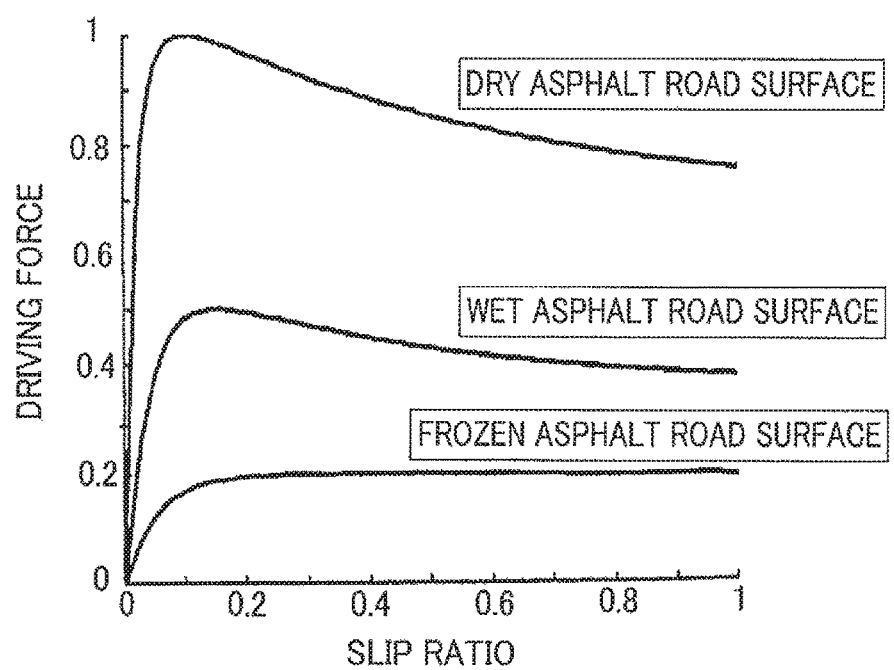
FIG. 5 is a graph showing a relationship between a slip ratio and a driving force on each of various road surfaces.

Regarding the slip ratio λ of the tire of the drive wheel 7 with respect to the road surface, as shown in an example in FIG. 5, a minimum value, that is, a value at which a grip ratio is maximum, is present at λ=0.15 even with any of a dry road surface, a wet road surface, and a frozen road surface. Therefore, when the ideal slip ratio λ0 is set at or around 0.15 as appropriate, the drive wheel maximum number of rotations Nmax can be determined on the basis of the driven wheel number of rotations N1 using the above formula (2).

However, in the low-speed range, the drive wheel maximum number of rotations calculated with the slip ratio is small, and thus, due to an error of the rotation detection section 15 (FIG. 3), it may be erroneously determined that a drive wheel number of rotations N2 has fallen within a watch range number of rotations which is set so as to be lower than the drive wheel maximum number of rotations Nmax, or it may be erroneously determined that the drive wheel number of rotations N2 has exceeded the drive wheel maximum number of rotations Nmax. In order to prevent such erroneous determination, the slip ratio is changed from the slip ratio which serves as a reference, in accordance with the vehicle speed in the low-speed range as described above.

As shown in FIG. 3, when the drive wheel number of rotations N2 observed by the drive wheel rotation number observation section 23 exceeds the calculated drive wheel maximum number of rotations Nmax, the slip state determination section 24 determines that a slip state has occurred. If the slip state determination section 24 determines that the drive wheel number of rotations N2 has exceeded the drive wheel maximum number of rotations Nmax, it can be inferred that a slip has occurred. At this time, the slip-time torque cancellation section 26 causes a torque command value, which is to be inputted to the torque control section 16, to be zero, or causes a current command, which is to be outputted from the torque control section 16, to be zero.

The slip control section 28 further includes slip watch range determination section 25 and watch range-time torque reduction section 27. If the slip state determination section 24 determines that the observed drive wheel number of rotations N2 has not exceeded the drive wheel maximum number of rotations Nmax, the slip watch range determination section 25 determines whether or not the drive wheel number of rotations N2 has exceeded a watch range number of rotations Nc which is set so as to be lower than the drive wheel maximum number of rotations Nmax. In other words, through comparison of the drive wheel number of rotations N2 with the watch range number of rotations Nc, the slip watch range determination section 25 determines what extent the drive wheel number of rotations N2 is close to the drive wheel maximum number of rotations Nmax.

For example, it is assumed that the watch range number of rotations Nc is the number of rotations that is lower than the drive wheel maximum number of rotations Nmax by 10% of a driven wheel number of rotations N1. That is, it is assumed that watch range number of rotations Nc=drive wheel maximum number of rotations Nmax−(driven wheel number of rotations N1*10%). If the slip watch range determination section 25 determines that the drive wheel number of rotations N2 has exceeded the watch range number of rotations Nc, the watch range-time torque reduction section 27 decreases the torque command value to the motor 3, or decreases the current command which is to be outputted from the torque control section 16.

FIG. 6 is a flowchart showing a control operation of the slip control device. A description will be given also with reference to FIG. 3. For example, this process starts under a condition that the power of the vehicle is turned on (START), and the control repetition cycle change section 30 of the slip control device 20 determines whether or not the vehicle speed detected by the vehicle speed detection section 29 is in the predetermined low-speed range (step S1). If it is determined that the vehicle speed is in the low-speed range (step S1: Yes), the control repetition cycle change section 30 lengthens the control repetition cycle of the slip control section 28 (step S2). Next, the driven wheel rotation number observation section 21 monitors, that is, observes, the driven wheel number of rotations N1 obtained from the rotation detection section 15, via the VCU 1 constantly (i.e., every control repetition cycle described above) (step S3).

The maximum rotation number calculation section 22 calculates the present drive wheel maximum number of rotations Nmax from the obtained present number of rotations N1 of the driven wheel 6 and from the slip ratio λ changed by the slip ratio change section 31, by using formula (2) (step S4). After the calculation of the drive wheel maximum number of rotations Nmax, the drive wheel rotation number observation section 23 observes and obtains the drive wheel number of rotations N2 (step S5). Next, the process proceeds to step S10. The drive wheel number of rotations N2 may not be obtained in step S5 but may be obtained during or prior to the calculation of the drive wheel maximum number of rotations Nmax in step S4.

If it is determined in step S1 that the vehicle speed is not in the low-speed range (step S1: No), the control repetition cycle of the slip control section 28 is fixed at 10 ms which is initially set (step S6). Next, the driven wheel rotation number observation section 21 observes the driven wheel number of rotations N1 (step S7). The maximum rotation number calculation section 22 calculates the present drive wheel maximum number of rotations Nmax from the obtained present number of rotations N1 of the driven wheel 6 and the slip ratio λ0, which serves as a reference, by using formula (2) (step S8), and the drive wheel rotation number observation section 23 observes and obtains the drive wheel number of rotations N2 (step S9). Thereafter, the process proceeds to step S10. The drive wheel number of rotations N2 may not be obtained in step S9 but may be obtained during or prior to the calculation of the drive wheel maximum number of rotations Nmax in step S8.

In step S10, the slip state determination section 24 determines whether or not the observed drive wheel number of rotations N2 has exceeded the drive wheel maximum number of rotations Nmax. If it is determined that the observed drive wheel number of rotations N2 has exceeded the drive wheel maximum number of rotations Nmax (step S10: Yes), the slip-time torque cancellation section 26 causes the torque command value, which is to be inputted to the torque control section 16, to be zero, or causes the current command, which is to be outputted from the torque control section 16, to be zero (step S11). In a state where a slip has occurred, the torque command value is maintained at zero. Thereafter, RETURN is made to return the process to START, and the routine in FIG. 6 is repeated from the initial step S1 again.

If it is determined in step S10 that the observed drive wheel number of rotations N2 has not exceeded the drive wheel maximum number of rotations Nmax (step S10: No), the slip watch range determination section 25 determines whether or not the drive wheel number of rotations N2 has fallen within the watch range (step S12). If it is determined that the drive wheel number of rotations N2 has not fallen within the watch range (step S12: No), the present state is a safe state where there is no slip, a process of torque change is not performed (step S13), RETURN is made to return the process to START, and the routine in FIG. 6 is repeated from the initial step S1 again.

If the slip watch range determination section 25 determines that the drive wheel number of rotations N2 has fallen within the watch range (step S12: Yes), the watch range-time torque reduction section 27 decreases the torque command value which is to be inputted to the torque control section 16, or decreases the current command which is to be outputted from the torque control section 16 (step S14). Specifically, the difference between the drive wheel number of rotations N2 and the drive wheel maximum number of rotations Nmax is calculated, and sequential deceleration is performed in which the torque command value is decreased by a larger amount as the difference decreases.

For example, as shown in FIG. 7, according to a nonlinear curve A which determines a relationship between the above difference (the horizontal axis) and a ratio of a torque caused to be outputted relative to a torque command inputted from the accelerator (the vertical axis), the torque is decreased by a larger amount as the difference decreases (the leftward direction of the horizontal axis in FIG. 7). Since an unstable state is enhanced as the drive wheel number of rotations gets close to the maximum number of rotations, the torque is decreased by a larger amount such that the present state quickly returns to a stable state. Accordingly, even if the drive wheel number of rotations exceeds the maximum number of rotations and thus the torque is forcedly made zero, no sudden torque change occurs, and vibration of the vehicle body is reduced, since the torque has been decreased beforehand in the watch range.

The curve A is assumed to be a curve in which: when the difference is zero, the output ratio of the torque is made zero; as the difference increases, the ratio of the torque caused to be outputted increases but the degree of the increase decreases; and when the difference gets out of the watch range, the output ratio of the torque becomes 100%. In addition, the curve A has a continuous shape (a shape that allows for differentiation at any point) from the point at which the difference is zero and the torque is zero to the point at which the torque is 100%.

As shown in FIG. 6, after step S14, RETURN is made to return the process to START, and the routine in FIG. 6 is repeated from the initial step S1 again.

According to the slip control device 20 described above, when the vehicle is in a slip state, the slip control section 28 performs the series of slip control of decreasing the torque command to the motor 3, in the variable control repetition cycle. While this slip control is performed, the control repetition cycle change section 30 lengthens the control repetition cycle of the slip control section 28 when the detected vehicle speed is in the predetermined low-speed range (e.g., equal to or less than 10 km/h). By making the control repetition cycle of the slip control section 28 variable and then lengthening the control repetition cycle in the low-speed range as described above, for example, the control repetition cycle and the response cycle of the sensor for detecting the driven wheel number of rotations can be caused to substantially coincide with each other, so that the response cycle of the sensor can be prevented from being too slow for the control repetition cycle of the slip control section 28. Accordingly, it is possible to prevent an erroneous operation of the slip control section 28 and accurately detect a driven wheel number of rotations, thereby accurately performing the slip control.

In the low-speed range, the slip ratio change section 31 changes the slip ratio $\lambda$ from the slip ratio $\lambda 0$, which serves as a reference, in accordance with the vehicle speed as described above, and thus the drive wheel number of rotations can be prevented from erroneously falling within the watch range or exceeding the drive wheel maximum number of rotations due to an error of the rotation detection section 15.

If the slip watch range determination section 25 determines that the drive wheel number of rotations has exceeded the watch range number of rotations, the watch range-time torque reduction section 27 decreases the torque command value to the motor 3, or decrease the current command which is to be outputted from the torque control section 16. As described above, even when no slip has occurred, if the drive wheel number of rotations falls within the watch range where a slip is likely to occur, the torque of the motor 3 is decreased to some extent beforehand, whereby shock and vibration of the vehicle body in the case that the torque is made zero due to occurrence of a slip are reduced, so that occurrence of an uncomfortable feeling in an occupant can be alleviated.

In the case of the in-wheel motor device 11 as in the embodiment, each wheel 7 is individually driven by the corresponding motor and is greatly affected by a slip, and therefore the effect by the above slip control is more effectively exerted.

In the embodiment, the response cycle Ts itself of the sensor 15b corresponding to the vehicle speed is designated as the control repetition cycle T of the slip control section 28, but the present invention is not limited to this example. For example, when the vehicle speed is in the low-speed range of not greater than an example speed of 10 km/h, the control repetition cycle T may be uniformly lengthened, or the low-speed range may be divided into a plurality of areas, and the control repetition cycle T may be lengthened by multiplying the initial control repetition cycle T by a multiplying factor that is set for each of the areas obtained by dividing mentioned above. In addition, the vehicle speed detection section 29 is independently provided, but the present invention is not limited to this example. For example, the vehicle speed may be obtained by differentiating a rotation angle of the driven wheel 6 which is detected by the rotation detection section 15.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

3 . . . motor
6 . . . driven wheel
7 . . . drive wheel
11 . . . in-wheel motor device
20 . . . slip control device (slip control section)
21 . . . driven wheel rotation number observation section
22 . . . maximum rotation number calculation section
23 . . . drive wheel rotation number observation section
24 . . . slip state determination section
25 . . . slip watch range determination section
27 . . . watch range-time torque reduction section
28 . . . slip control section
29 . . . vehicle speed detection section
30 . . . control repetition cycle change section
31 . . . slip ratio change section

What is claimed is:

1. A slip control device for an electric vehicle which is a vehicle including an electric motor configured to rotationally drive a drive wheel, the slip control device performing slip control of the electric vehicle, the slip control device comprising:
a drive wheel rotation number observation section configured to observe the number of rotations of the drive wheel;
a driven wheel rotation number observation section configured to observe the number of rotations of a driven wheel;
a slip control section configured to perform a series of slip control which determine whether or not a slip state has occurred, on the basis of the number of rotations of the drive wheel observed by the drive wheel rotation number observation section and the number of rotations of the driven wheel observed by the driven wheel rotation number observation section, and which decrease a torque command value to the motor if the slip state has occurred, the slip control section repetitively performing the series of slip control in a control repetition cycle, the control repetition cycle being a time period or periodic time of one cycle of the series of slip control;
a vehicle speed detection section configured to detect a vehicle speed; and
a control repetition cycle change section configured to lengthen the control repetition cycle of the slip control section when the vehicle speed detected by the vehicle speed detection section is in a predetermined low-speed range of 0-10 km/h.

2. The slip control device for the electric vehicle as claimed in claim 1, wherein the electric vehicle includes a rotation detection section configured to detect the number of rotations of the driven wheel, and the rotation detection section includes:

a rotor with a plurality of to-be-detected portions arranged around a rotation center at equal pitches, the rotor configured to rotate integrally with the driven wheel; and
a sensor opposed to the to-be-detected portions of the rotor and configured to detect the to-be-detected portions, and
when the vehicle speed is in the predetermined low-speed range, the control repetition cycle change section sets the control repetition cycle T in accordance with the vehicle speed according to a following formula: $T=1000\times 2\pi R/VN$,
where R is a tire radius (m), V is the vehicle speed (m/s), and N is the number of the to-be-detected portions of the rotor.

3. The slip control device for the electric vehicle as claimed in claim 1, wherein the slip control section includes:
a slip ratio change section configured to change a slip ratio $\lambda$ when the vehicle speed detected by the vehicle speed detection section is in the predetermined low-speed range;
a maximum rotation number calculation section configured to calculate a present drive wheel maximum number of rotations Nmax using the slip ratio $\lambda$ changed by the slip ratio change section and a present number of rotations N1 of the driven wheel observed by the driven wheel rotation number observation section, according to a relation indicated by a following formula: $(Nmax-N1)/N1=\lambda$; and
a slip state determination section configured to determine that a slip state has occurred, when the number of rotations of the drive wheel observed by the drive wheel rotation number observation section has exceeded the calculated drive wheel maximum number of rotations Nmax.

4. The slip control device for the electric vehicle as claimed in claim 3, wherein when the vehicle speed is in a predetermined intermediate-speed range or a predetermined high-speed range, the maximum rotation number calculation section calculates the present drive wheel maximum number of rotations Nmax by using a slip ratio $\lambda 0$, which serves as a reference, instead of the changed slip ratio $\lambda$.

5. The slip control device for the electric vehicle as claimed in claim 3, wherein the slip control section includes:
a slip watch range determination section configured to determine whether or not the number of rotations of the drive wheel has exceeded a watch range number of rotations which is set so as to be lower than the drive wheel maximum number of rotations, if the slip state determination section determines that the number of rotations of the drive wheel has not exceeded the drive wheel maximum number of rotations; and
a watch range-time torque reduction section configured to decrease the torque command value to the motor if the slip watch range determination section determines that the number of rotations of the drive wheel has exceeded the watch range number of rotations.

6. The slip control device for the electric vehicle as claimed in claim 1, wherein the motor is forming an in-wheel motor device.

* * * * *